United States Patent [19]
Ikeda et al.

[11] Patent Number: 5,349,664
[45] Date of Patent: * Sep. 20, 1994

[54] INITIAL PROGRAM LOAD CONTROL SYSTEM IN A MULTIPROCESSOR SYSTEM

[75] Inventors: Masayuki Ikeda; Koichi Ueda, both of Kawasaki, Japan

[73] Assignee: Fujitsu Limited, Kawasaki, Japan

[ * ] Notice: The portion of the term of this patent subsequent to Aug. 13, 2093 has been disclaimed.

[21] Appl. No.: 921,994

[22] Filed: Aug. 3, 1992

Related U.S. Application Data

[63] Continuation of Ser. No. 280,822, Dec. 7, 1988, abandoned.

[30] Foreign Application Priority Data

Dec. 9, 1987 [JP] Japan ................. 62-309455

[51] Int. Cl.$^5$ .............. G06F 13/14; G06F 15/16
[52] U.S. Cl. .............. 395/700; 364/229.41; 364/230.6; 364/230.3; 364/238.4; 364/230.1; 364/284.3; 395/200
[58] Field of Search ................. 395/650, 700

[56] References Cited

U.S. PATENT DOCUMENTS

| | | | |
|---|---|---|---|
| 3,934,232 | 1/1976 | Curley et al. | 364/200 |
| 4,335,426 | 6/1982 | Maxwell et al. | 364/200 |
| 4,466,063 | 8/1984 | Segarra et al. | 364/200 |
| 4,590,555 | 5/1986 | Bourrez | 364/200 |
| 4,752,870 | 11/1988 | Matsumura | 364/200 |
| 4,779,189 | 10/1988 | Legvold et al. | 364/200 |
| 4,785,397 | 11/1988 | Koizumi et al. | 364/200 |
| 4,803,623 | 2/1989 | Klashka et al. | 364/200 |
| 4,811,284 | 3/1989 | Adler et al. | 364/900 |
| 4,833,599 | 5/1989 | Colwell et al. | 364/200 |
| 5,228,127 | 7/1993 | Ikeda et al. | 395/200 |

FOREIGN PATENT DOCUMENTS

| | | |
|---|---|---|
| 0036172 | 3/1981 | European Pat. Off. . |
| 0106213 | 9/1983 | European Pat. Off. . |
| 0222370 | 11/1986 | European Pat. Off. . |
| 0270680 | 5/1987 | European Pat. Off. . |

OTHER PUBLICATIONS

European Search Report for EP-88-31-1662, Berlin, Dec. 15, 1989.

*Primary Examiner*—Gareth D. Shaw
*Assistant Examiner*—John Q. Chavis
*Attorney, Agent, or Firm*—Staas & Halsey

[57] ABSTRACT

A method and apparatus for executing an initial program load (IPL) control in a multiprocessor system. The multiprocessor system including a global storage unit and a plurality of clusters, each of the clusters having at least one or more processors and a local storage unit, and one of the clusters having a direct access storage device. The method comprising the steps of executing the IPL from the processor belonging to the cluster having the direct access storage device to the local storage unit belonging to that cluster; transferring the IPL information from the local storage unit executing the IPL to the global storage unit; and transferring the IPL information from the global storage unit to the local storage unit in another cluster not having the direct access storage device.

4 Claims, 10 Drawing Sheets

INITIAL PROGRAM LOAD CONTROL SYSTEM IN A MULTIPROCESSOR SYSTEM

This application is a continuation of application Ser. No. 07/280,822, filed Dec. 7, 1988, now abandoned.

BACKGROUND OF THE INVENTION

1. Field of the Invention

The present invention relates to an initial program load (IPL) control system in a multiprocessor system, more particularly, it relates to a method and apparatus for executing the IPL in a multiprocessor system divided into a plurality of clusters.

The present invention is advantageous for a large scale numerical simulation in scientific and technical fields in which high speed calculations are a necessity.

2. Description of the Related Art

A multiprocessor system is constituted by a plurality of processors, and for cluster control, the plurality of processors are divided into a plurality of groups, each of which is called a "cluster", and then control of an access between processors is performed through each cluster. Namely, each cluster is an element in processing the access control of the processors.

The IPL is an initial setting procedure for loading a program, to start the operation of an operating system (OS) from an auxiliary storage device (for example, a direct access storage device (DASD)) to a main memory or a local storage unit.

SUMMARY OF THE INVENTION

The object of the present invention is to provide an initial program load control system in a multiprocessor system enabling a reduction in the time required to transfer the initial program to a local storage unit included in each of the clusters.

In accordance with the present invention, there is provided an apparatus for executing an initial program load (IPL) between processors constituting a multiprocessor system, the processors being divided into a plurality of clusters, the apparatus comprising: a global storage unit, a global control unit, connected to each of the clusters and the global storage unit through a corresponding bus line, for processing an order between the clusters; a memory control unit, provided in each cluster and connected between the global control unit and each of the processors belonging to the cluster, for controlling a transmission and reception of the order between the global control unit and the processor; a local storage unit, provided in each of the clusters and connected to the memory control unit, for storing data; and a service processor, provided in each of the clusters and connected to the memory control unit, for processing the reset operation and an IPL operation; wherein one of the clusters further comprises a direct access storage device connected to the memory control unit, for storing the IPL information.

Further, in accordance with the present invention, there is provided a method for executing an initial program load (IPL) control in a multiprocessor system, the multiprocessor system having a global storage unit, a global control unit and a plurality of clusters, each of the clusters having at least one or more processors and a local storage unit, and one of the clusters having a direct access storage device, the method comprising: executing the IPL from the processor belonging to the cluster having the direct access storage device to the local storage unit belonging to that cluster; transferring the IPL information from the local storage unit executing the IPL to the global storage unit; and transferring the IPL information from the global storage unit to the other local storage units in clusters not having the direct access storage device.

DESCRIPTION OF THE PREFERRED EMBODIMENTS

Before describing the preferred embodiments, an explanation will be given of a conventional multiprocessor system.

Figure 1:
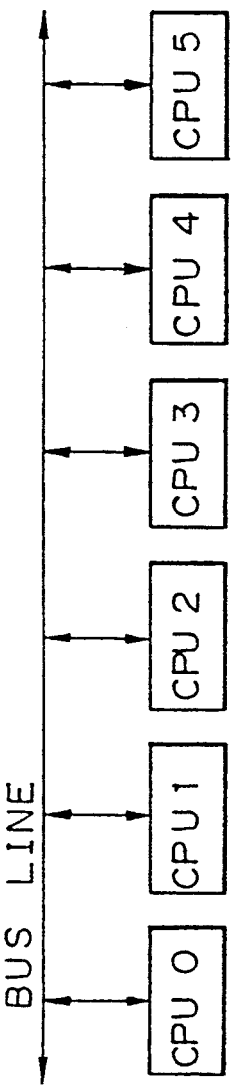
FIG. 1 is a schematic block diagram of a conventional multiprocessor system.

FIG. 1 is a schematic block diagram of a conventional multiprocessor system. In FIG. 1, the multiprocessor system is constituted by, for example, processors CPU0 to CPU5. Each processor is connected in parallel to another processor through a bus line BUS and mutual control is carried out between one processor and the other.

In this multiprocessor system, each processor is set to one of four states having an exclusive relationship therebetween; i.e., any one of four states ("STOP", "OPERATION", "LOAD" and "CHECK-STOP") is set in each processor. When carrying out an access, one processor outputs a sense signal to the other processor, to recognize the state of the other processor, receives a response from the other processor involving one of the above four states, and carries out mutual control in accordance with the above four states.

In this system, however, much time is necessary for the management of access steps between the processors, and thus it is difficult to achieve high speed processing in the multiprocessor system. Further, the control program is complicated due to the large number of access steps.

Figure 2:
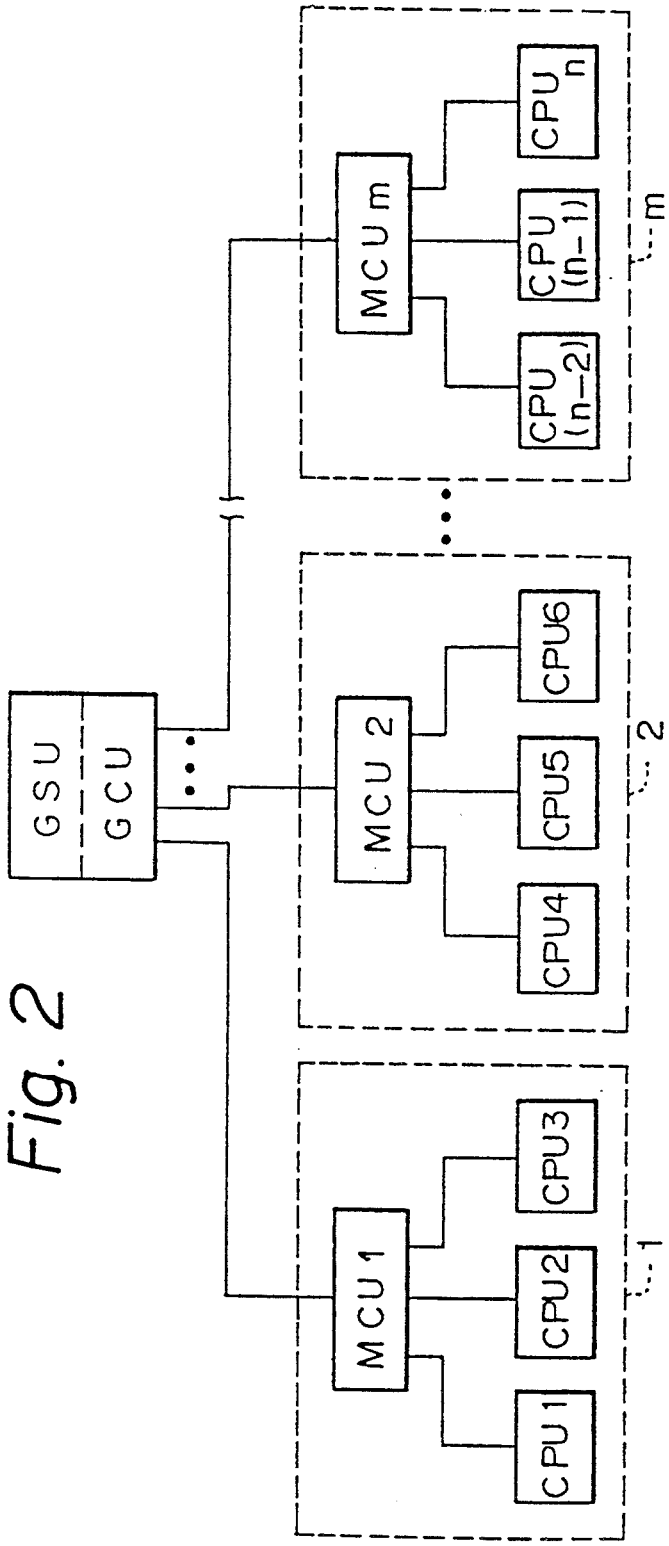
FIG. 2 is a basic block diagram of an apparatus for a cluster control in the multiprocessor system.

FIG. 2 is a basic block diagram of an apparatus for the cluster control in the multiprocessor system. In FIG. 2, a plurality of processors CPU1 to CPUn are divided into "m" groups (1 to m) each having three processors, each group is called a "cluster". MCU1 to MCUm are memory control unit. A memory control unit is provided in each cluster and connected between the processors and a global control unit GCU. The global control unit GCU controls the access between clusters, as explained in detail hereinafter, and is contained in a global storage unit GSU. The state of each cluster is defined by the memory control unit MCU based on the state of the processors belonging to that cluster. Further, the global control unit GCU sets up an order for each cluster. The memory control unit MCU controls the processors based on the order for each cluster.

In the above structure, since the access between processors is controlled through the cluster, it is possible to reduce the control time between processors. Further, it is possible to simplify the control program since the access is performed between clusters.

Figure 3:
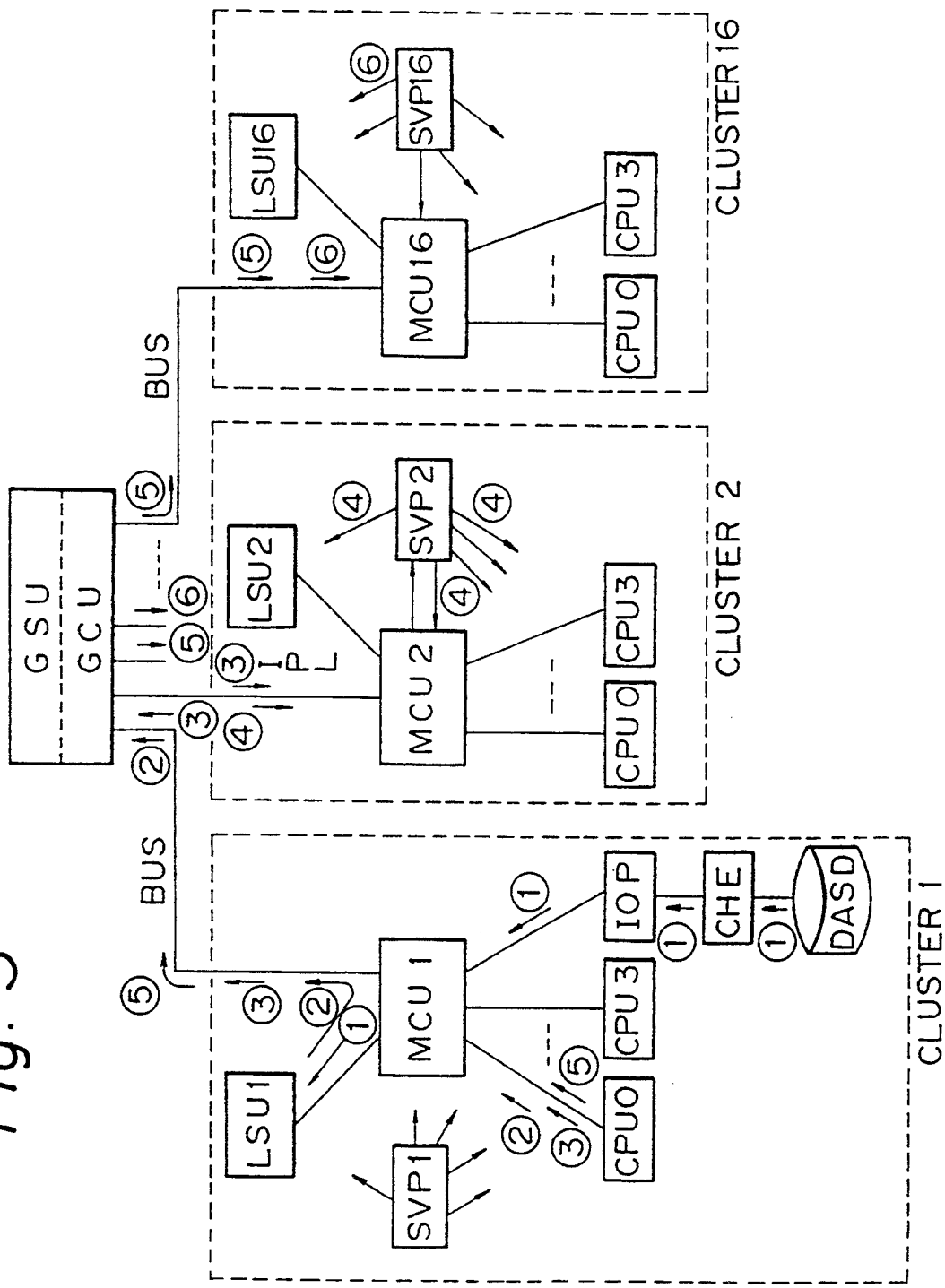
FIG. 3 is a schematic block diagram of each cluster according to an embodiment of the present invention.

FIG. 3 is a schematic block diagram of each cluster according to an embodiment of the present invention. In FIG. 3, the multiprocessor system is constituted by sixty four processors, which are divided into sixteen clusters (CLUSTER1 to CLUSTER16) each having four processors CPU0 to CPU3. Therefore, the global control unit GCU controls only sixteen clusters 1 to 16 through the bus line BUS. In this case, clusters 2 to 16 have the same structure and cluster 1 has a structure different from that of the other clusters 2 to 16.

As shown in the drawing, cluster 1 comprises a memory control unit MCU1, four processors CPU0 to CPU3, a local storage unit LSU1, a direct access storage device DASD, a service processor SVP1, an input-/output processor IOP, and a channel element CHE connected between the IOP and the DASD. And each of the clusters 2 to 16 comprises a memory control unit MCU, four processors CPU0 to CPU3, a local storage unit LSU, and a service processor SVP. The global control unit GCU is used in common for all clusters 1 to 16, and connected to each cluster through the bus line BUS.

The processors belonging to each cluster are individually defined by the four states "STOP", "OPERATION", "LOAD" and "CHECK-STOP", and these four states are exclusive therebetween and change under the following conditions:
   (1) When an operator uses an operating facility.
   (2) When the processor receives a specified "SIGNAL-PROCESSOR (SIGP)" order for that processor.
   (3) When the cluster having that processor receives a specified "GLOBAL SIGNAL PROCESSOR (GSIGP)" order for that cluster.

Further, the state of the cluster is based on the state of the processors belonging to that cluster, as follows.
   CLUSTER-STOP
   None of the processors in the cluster are in the OPERATION or LOAD state and at least one processor in the cluster is in the STOP state.
   CLUSTER-CHECK-STOP
   None of the processors are in the STOP, OPERATION or LOAD states. These states further include the states wherein the processor is not connected to each other or none of the processors are supplied with power.
   SUBSYSTEM-DAMAGE
   When channel subsystem damage is found in the cluster, the cluster is placed in the SUBSYSTEM-DAMAGE state. When the SUBSYSTEM-DAMAGE state is set, the CLUSTER-STOP and CLUSTER-CHECK-STOP states are simultaneously set in the cluster.

In this embodiment, when one processor commands another processor to process an order, the command is sent to the cluster to which the other processor belongs, that is the command is not directly to the other processor.

The three main orders which are sent to each cluster are defined as follows. Namely, the CLUSTER-SENSE order, the CLUSTER-SYNCHRONOUS-CALL order (floating interruption order), and the CLUSTER-RESET and LOAD order (RESET and IPL order). Further, for example, the CLUSTER-BROADCAST-INTERRUPTION order for accessing the same order to all clusters and the CLUSTER-ASYNCHRONOUS-INTERRUPTION order are used, and these orders are called as a whole a GSIGP order. The GSIGP order is mainly used for a floating interruption between the processors, as explained hereinafter.

Figures 4, 9A:
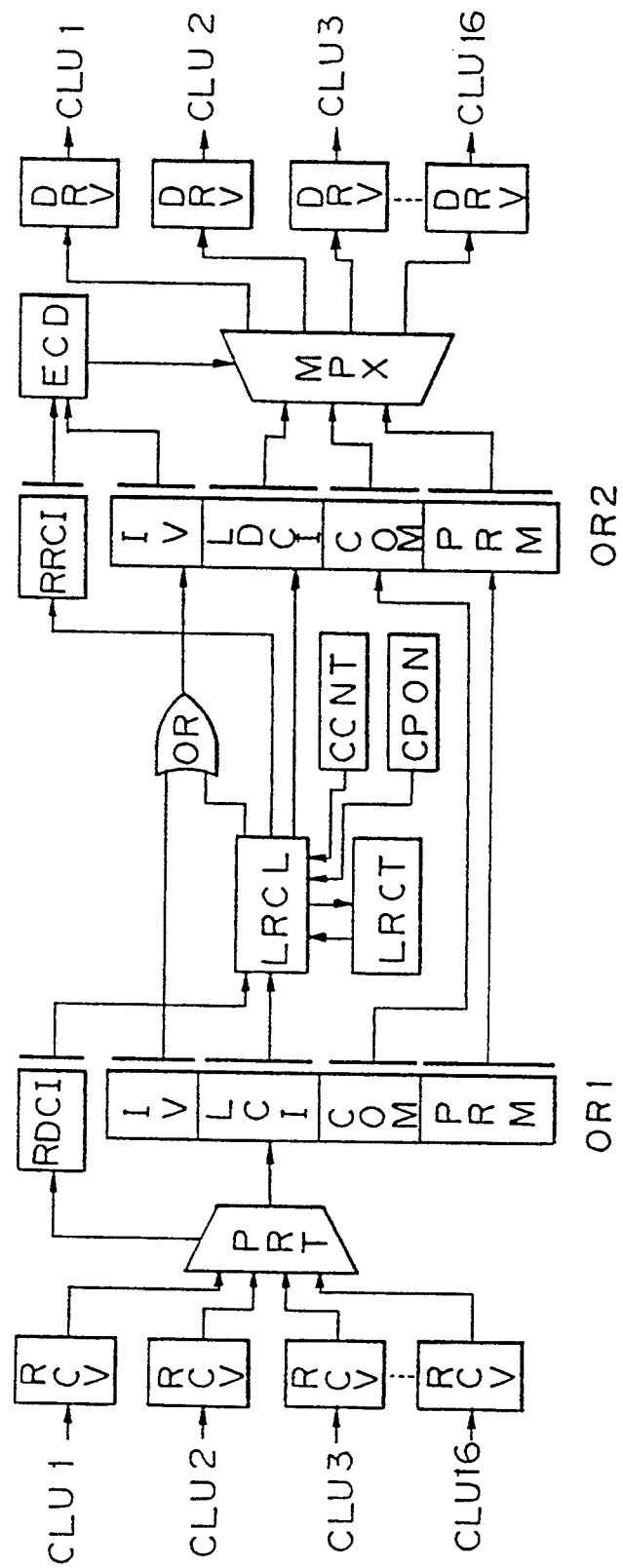
FIG. 4 is one example of a format of an order.
FIGS. 9A and 9B are schematic block diagrams of a global control unit according to the present invention.
Figure 5A:
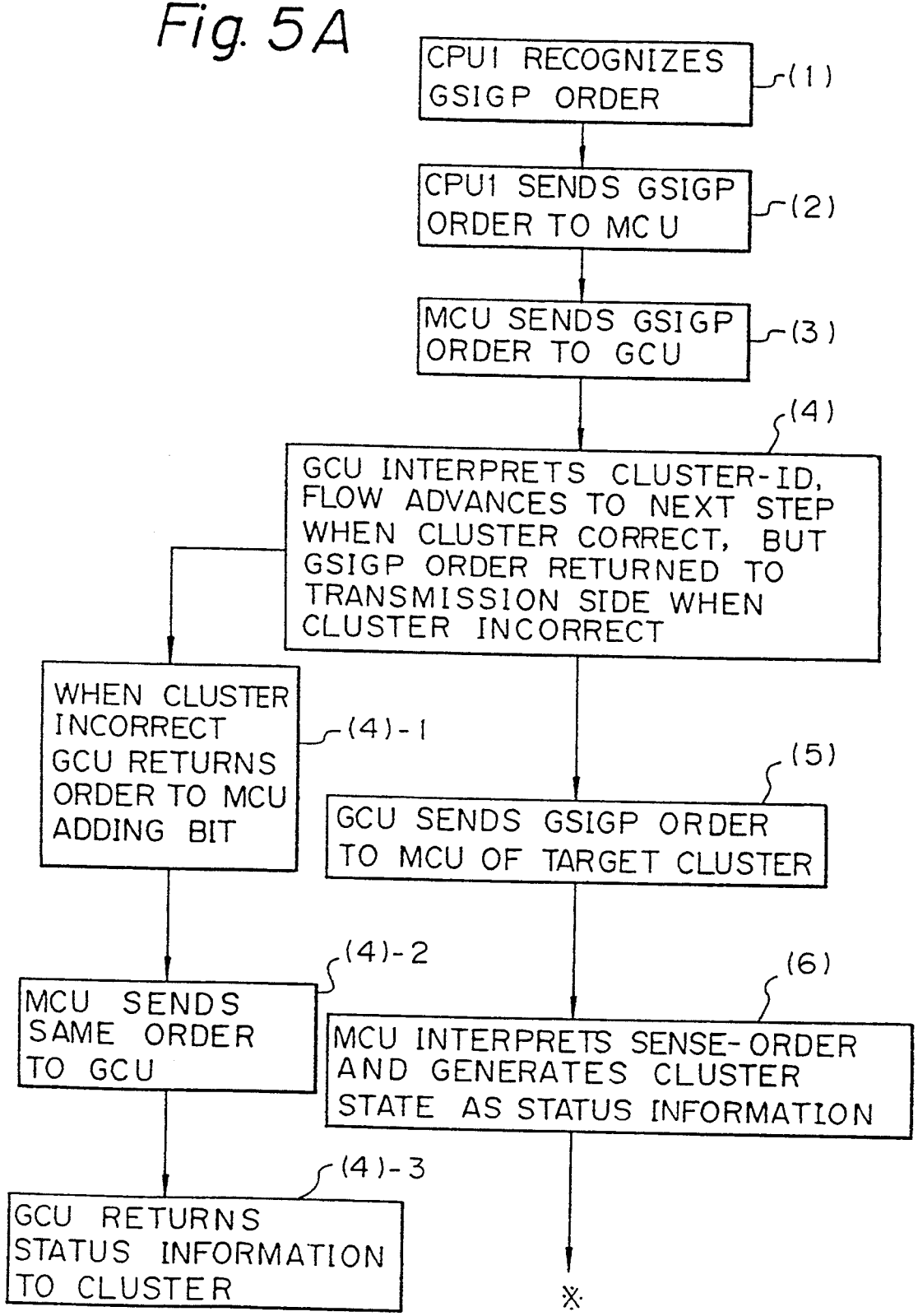
FIG. 5A and 5B are flowcharts for explaining a CLUSTER-SENSE order.
Figure 5B:
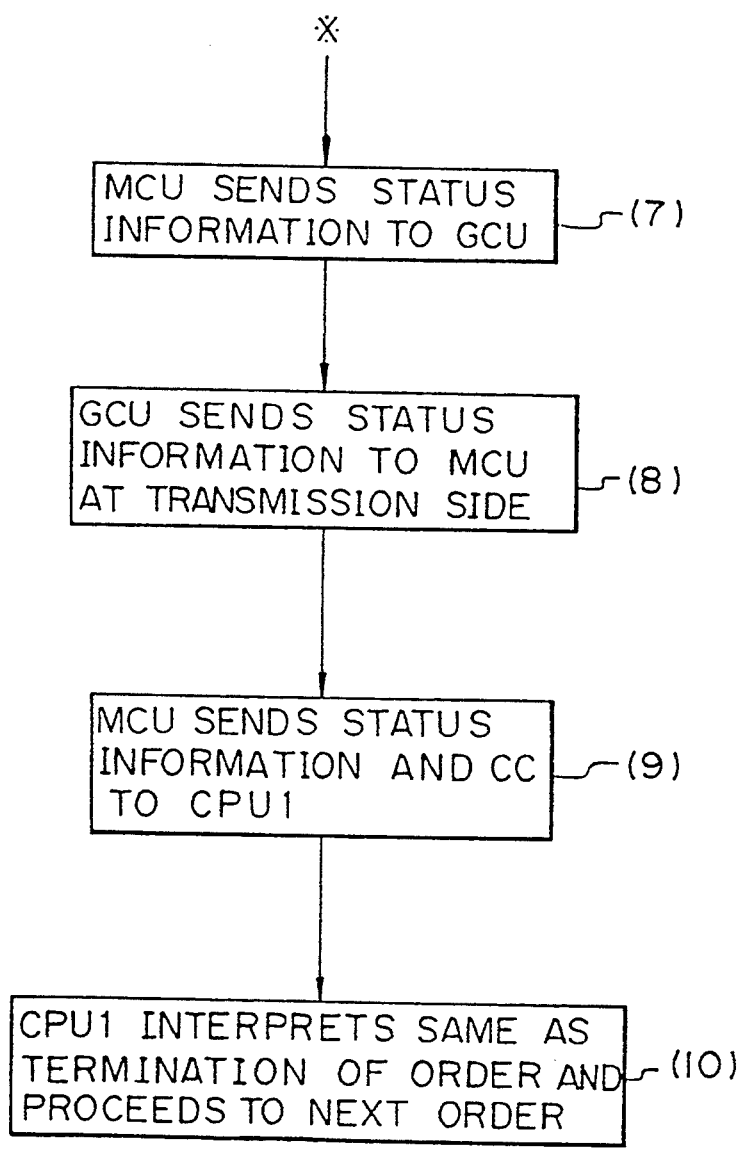

The operation of these orders is explained in detail hereinafter.
   CLUSTER-SENSE order
   The flowchart of the following steps is shown in FIGS. 5A and 5B.
   (1) The processor 1 (CPU1) in cluster 1 decodes and recognizes the GSIGP order.
   (2) The processor 1 sends the GSIGP order to the memory control unit MCU. The GSIGP order includes a CLUSTER-ID portion and an ORDER portion.
   (3) The memory control unit MCU sends the GSIGP order to the global control unit GCU. The GSIGP order includes a SENSE command, a CLUSTER-ID, and a parameter, as shown in FIG. 4.
   (4) The global control unit GCU interprets the CLUSTER-ID. When the correct cluster (connected to the GCU) is designated, the flow proceeds to the next step. When the designated cluster is incorrect, the GSIGP order is returned to the cluster at the transmission side with the information "incorrect destination".
   (5) The global control unit GCU sends the GSIGP order to the memory control unit MCU of the target cluster.
   (6) When the memory control unit MCU at the reception side interprets the SENSE order, it generates the state of that cluster as the status information based on the states of the processors, the information from the input/output processor IOP, and the states of the synchronous call (floating interruption order)in the MCU.
   (7) The memory control unit MCU in the cluster at the reception side sends the status information of that cluster to the global control unit GCU.
   (8) The global control unit GCU sends the received status information to the memory control unit MCU in the cluster at the transmission side.
   (9) The memory control unit MCU sends the received status information and a condition code (CC) to the processor CPU1 which generated the GSIGP order.
   (10) When the processor CPU1 receives the status information and the condition code CC, it interprets this as a termination of the GSIGP order, and proceeds to the next order.

In the case of an "incorrect destination" mentioned in step (4), as shown in steps (4)-1, (4)-2 and (4)-3, the global control unit GCU returns the GSIGP order including the incorrect destination to the memory control unit MCU at the transmission side in the same order as the GSIGP order was sent from the cluster. In this case, a flag bit indicating the incorrect destination is added to the order. When the memory control unit MCU at the transmission side recognizes the flag bit in the GSIGP order received, the MCU returns the same GSIGP order as above to the global control unit GCU as the status information. At that time, the content of the GSIGP order is ignored. The global control unit GCU sends the returned status information to the memory control unit MCU at the transmission side as the status information, and the status information received from the destination side in the case of a normal GSIGP order. The interface lines between the MCU and the GCU include a signal line for discriminating either the status information or the order from the transferred information. As explained above, in the case of an incorrect destination, the GSIGP order is sent to the memory control unit MCU as the order and that order is returned to the global control unit GCU, and then that order is again returned to the memory control unit MCU as the status information. This is because these procedures make the operation procedures at the GCU and the MCU almost identical regardless of the correctness of the cluster ID.

CLUSTER-SYNCHRONOUS-CALL order

Figure 6:
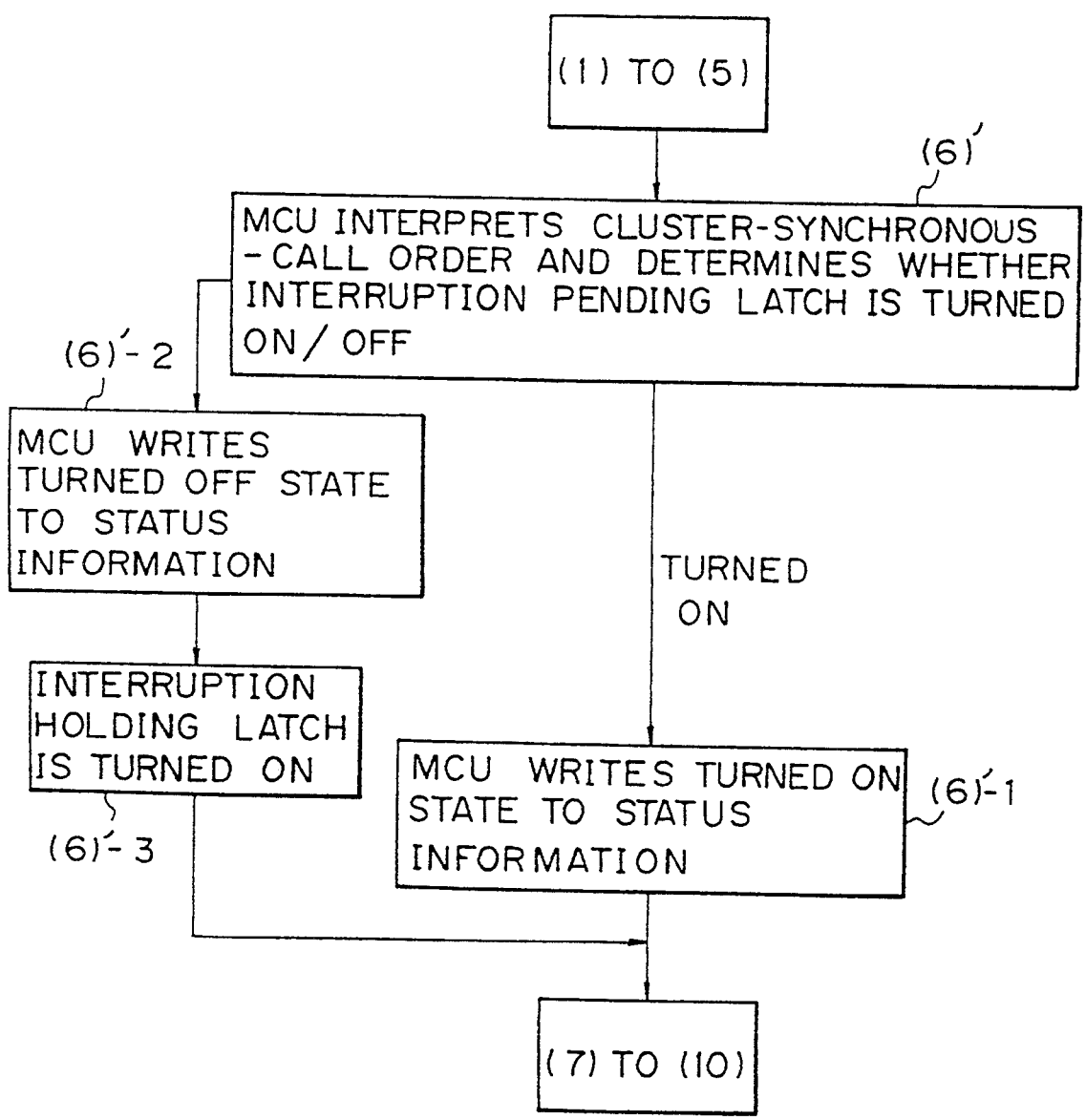
FIG. 6 is a flowchart for explaining a CLUSTER-SYNCHRONOUS-CALL order.

The flowchart of this step is shown in FIG. 6.

Since the procedures from step (1) to step (5) are the same as for the steps shown in FIG. 5, an explanation thereof is omitted. The following step follows step (5).

When the memory control unit MCU of the reception side interprets the CLUSTER-SYNCHRONOUS-CALL order, it determines whether or not an interruption pending latch of that memory control unit MCU is turned ON as shown by step (6). When the latch is turned ON, the memory control unit MCU writes the "turned ON state" to the status information as shown by step (6)'-1. When the latch is turned OFF, the memory control unit MCU writes the "turned OFF state" to the status information, and then the interruption pending latch of the memory control unit MCU is turned ON as shown by steps (6)'-2 and (6)'-3.

The same procedures as for step (7) to step (10) are then carried out as discussed above with reference to FIG. 5B. Further, when the interruption enabled processor exists in the cluster at the reception side, the interruption is made to that processor.

The procedures of the IPL control according to the present invention are expressed as follows.

Figure 7:
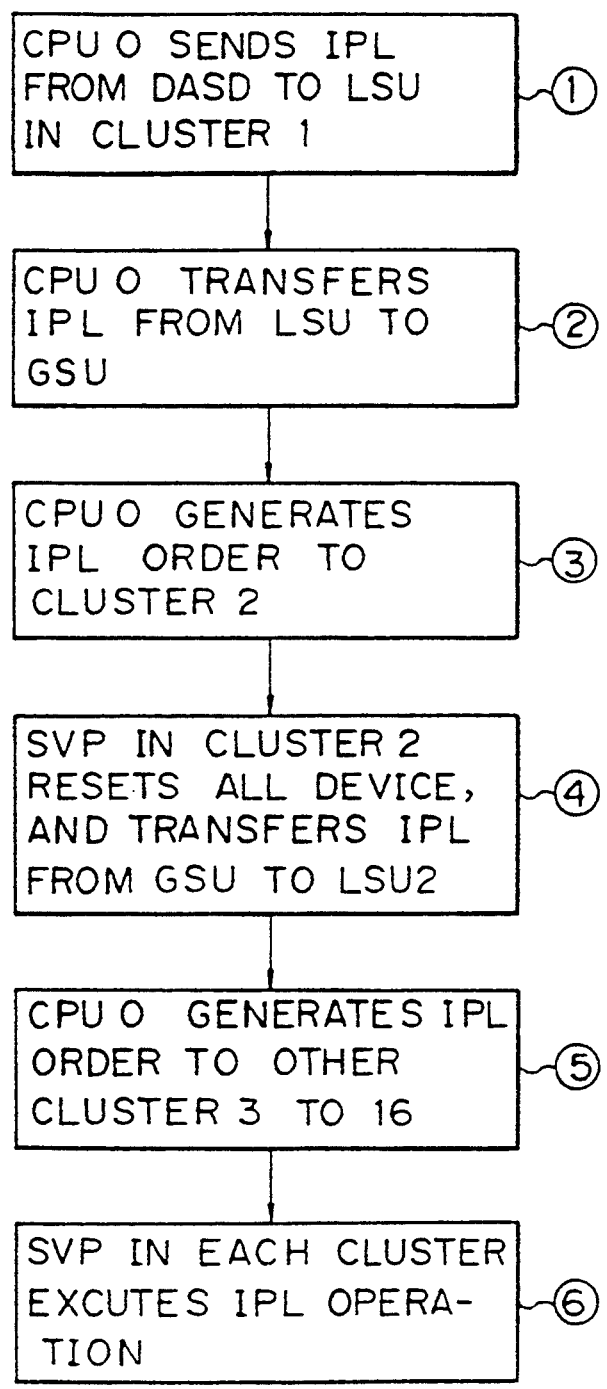
FIG. 7 is a flowchart for explaining an IPL control according to the present invention.

The flowchart of this step is shown in FIG. 7. The encircled numbers in FIG. 3 correspond also to the following steps:

① In cluster 1 having the direct access storage device DASD, the processor CPU0, for example, commands that IPL information be sent from the DASD to the local storage unit LSU1 through the channel element CHE, the input/output processor IOP and the memory control unit MCU1, and stores it in the LSU1.

② The processor CPU0 transfers the IPL information from the LSU1 to the global storage unit GSU through the global control unit GCU.

③ The processor CPU0 generates a reset and IPL order to cluster 2.

④ The service processor SVP2 belonging to the cluster 2 resets all devices in cluster 2 and transfers the IPL information from a predetermined area in the GSU to the LSU 2 in cluster 2.

⑤ The processor CPU0 belonging to cluster 1 generates the IPL order to the other clusters 3 to 16, in succession.

⑥ When each cluster receives the IPL order, the service processor SVP belonging to each cluster executes the same IPL operation as in step ④. In this case, the IPL order is independently generated in succession from the cluster 1, regardless of the IPL operation at the other clusters, and the IPL operation in each cluster is independently executed in parallel in each cluster.

In accordance with the present invention, since it is not necessary to provide the direct access storage device DASD storing the IPL information, at every cluster, it is possible to reduce the number of DASD. Further, it is possible to reduce a transfer time for the IPL order since the IPL operation at each cluster is independently executed in every cluster. Still further, a cluster can be directly re-IPL operated from the global storage unit GSU after an occurrence of errors or an activity of maintenance.

Figure 8:
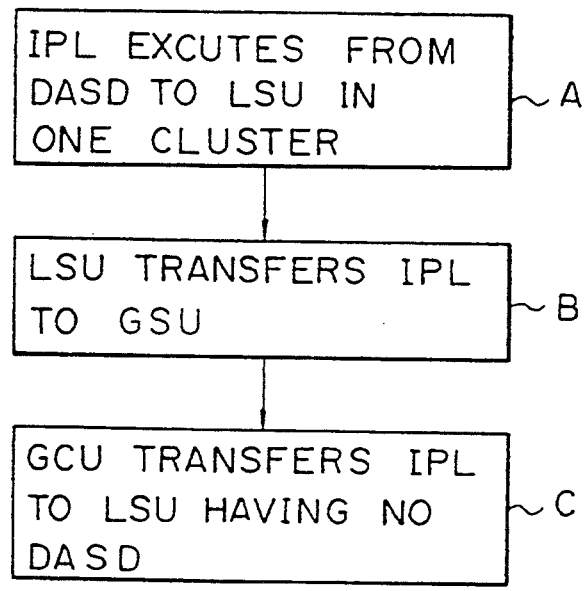
FIG. 8 is a flowchart for explaining a basic IPL control according to the present invention.

FIG. 8 is a basic flowchart of the present invention. In this flowchart, the IPL operation is executed from the DASD to the LSU in one cluster (step A), the IPL information is transferred from the LSU to the GSU (step B) and the IPL information is transferred from the GSU by the GCU to the LSU's in the other clusters not having the DASD (step C).

FIG. 9A is a schematic block diagram of a global control unit GCU according to an embodiment of the present invention. The global control unit GCU includes a unit for transferring the GSIGP orders and a unit for controlling the access to the global storage unit GSU. In FIG. 9A, RCV represents a receiver, PRT a priority circuit, LRCL a logical-to-real cluster translation logic circuit, LRCT a logical-to-real cluster translation table, CCNT a cluster connecting table, CPON a cluster power-ON table, MPX a multiplexer, ECD an encoder, OR an OR circuit and DRV a driver.

The order OR1 comprises a CLUSTER-INVALID (IV), a LOGICAL-CLUSTER-ID (LCI), a command (COM), and a parameter (PRM). Further, the order OR2 is similar except that it comprises a LOGICAL-DRIVE-CLUSTER-ID (LDCI) instead of the LOGICAL-CLUSTER-ID (LCI). RDCI is a REAL-DRIVE-CLUSTER-ID and RRCI is a REAL-RECEIVE-CLUSTER-ID.

The cluster connecting table CCNT indicates the state of connection of the clusters; the command COM designates the order of the GSIGP; the cluster power-ON table CPON indicates a power-ON/OFF state of the clusters; the driver DRV transfers the order to the cluster; and the encoder ECD encodes the IV bit and the RRCI bit and determines the destination of the processor transferring the order. The bit IV indicates the invalidity of the cluster, and is normally "0" when generating the command request and turned ON when the designated cluster does not exist or the power is not turned ON; the bit LCI is a logical identifier and the target of the request is designated by the logical cluster number; and the bit LDCI is a logical processor number of the processor generating the request and sets the output of the circuit LRCL.

The circuit LRCL is a logical block converting a logical cluster number to a physical cluster number. The circuit LRCL inputs the bit LCI and outputs the bit RRCI by referring to the table LRCT. In the conversion, the circuit LRCL checks whether or not the designated real cluster is connected and the power of the designated real cluster is turned ON. If the designated cluster is incorrect, the bit IV is turned ON. Further, the circuit LRCL converts the bit RDCI to the bit LDCI.

The table LRCT refers to the relationship between the logical cluster number and the physical cluster number. The multiplexer MPX selects the target cluster. The parameter PRM is an additional information to the command COM. The priority circuit PRT determines the cluster competition state and gives the priority right to the request. The receiver RCV receives the request from the cluster CLU0 to CLU3. The bit RDCI is a real cluster number which generated the request and is set by the output of the priority circuit PRT. The bit RRCI is a real cluster number indicating the destination of the transferred order and is set by the output of the circuit LRCL.

Figure 9B:
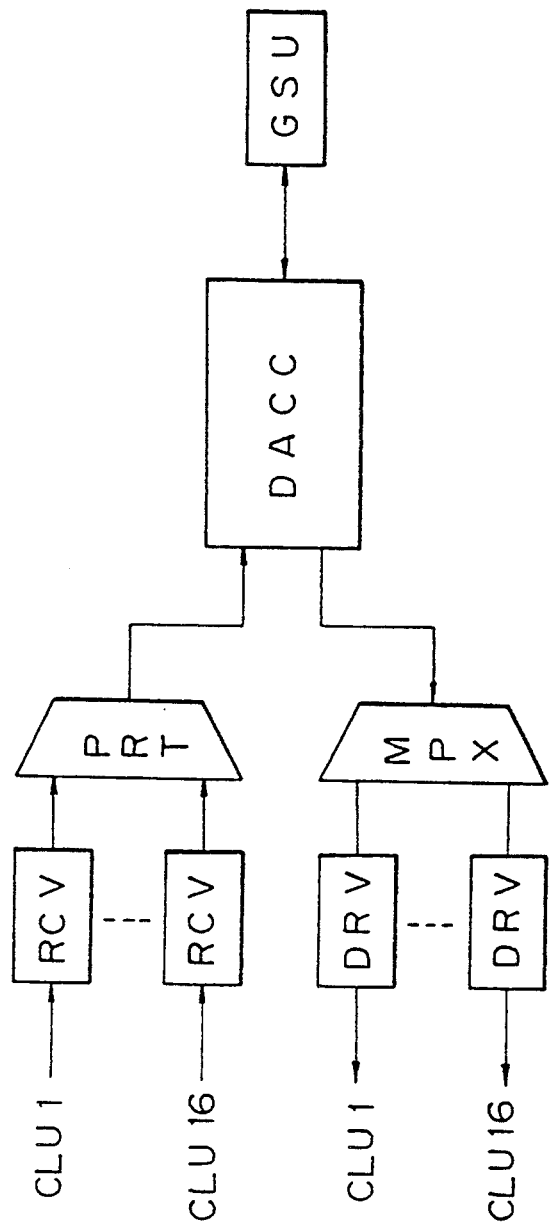

FIG. 9B shows a unit for controlling the access to the GSU and having receivers RCV, a priority circuit PRT, a data access control circuit DACC, a multiplexer MPX, and drivers DRV. The detailed structure and the operation will be readily understood by ordinary skilled persons, and therefore, the explanation is omitted.

Figure 10:
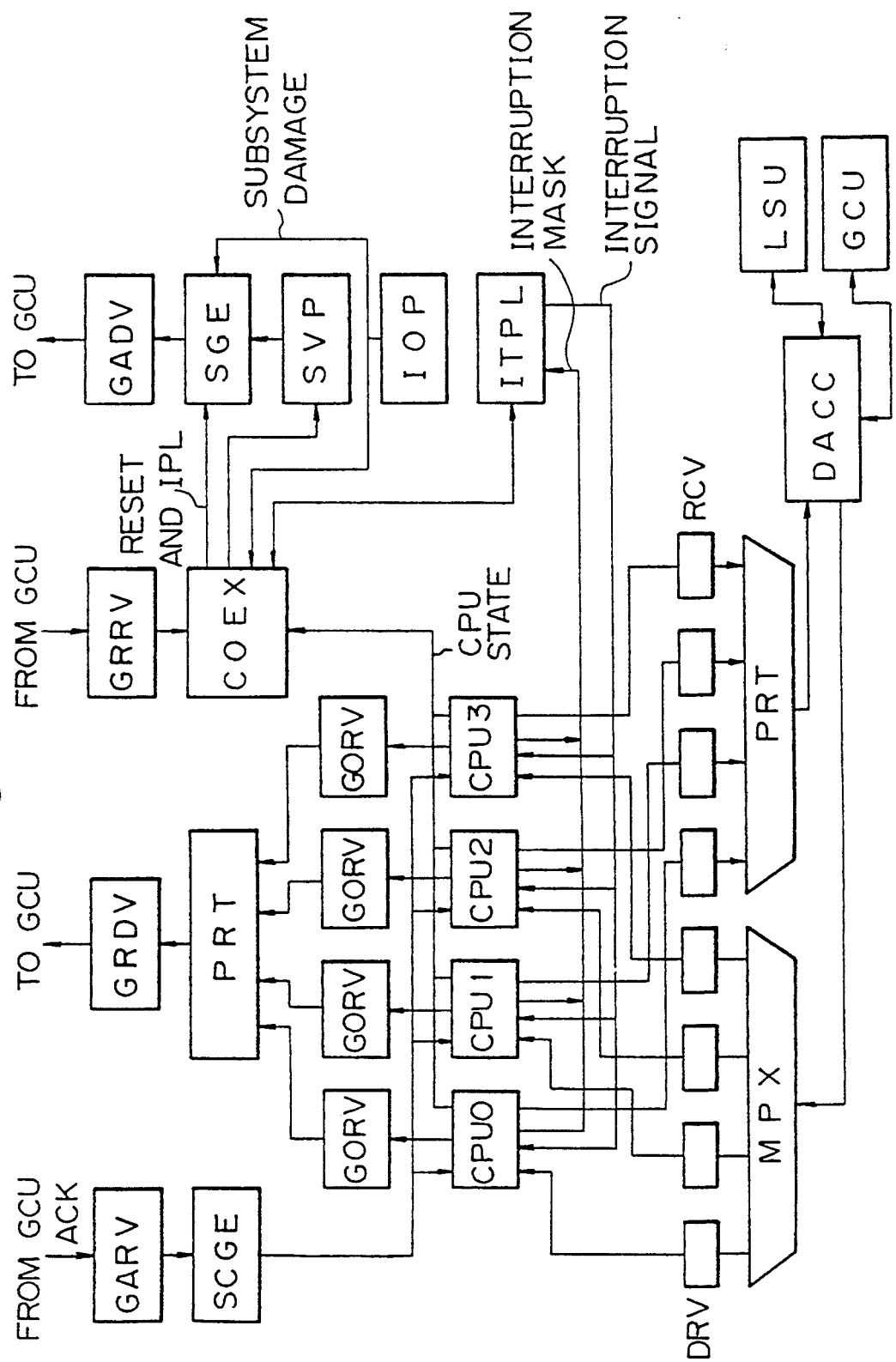
FIG. 10 is a schematic block diagram of a memory control unit according to the present invention.

FIG. 10 is a schematic block diagram of the memory control unit MCU according to an embodiment of the present invention. The MCU also includes a unit for transferring the GSIGP orders and a unit for controlling the storage access. In FIG. 10, GORV represents a GSIGP order receiver, SCGE a status and condition code generator, GARV a GSIGP acknowledge receiver, GRDV a GSIGP request driver, GRRV a GSIGP request receiver, COEX a command executer, ITPL a interruption pending latch, IOP a I/O processor, SGE a status generator, and GADV a GSIGP acknowledge driver.

The GSIGP acknowledge receiver GARV is a circuit receiving the acknowledge ACK from the global control unit GCU; the status and condition code generator SCGE is a circuit generating the STATUS and CC based on the acknowledge ACK; the GSIGP request driver GRDV is a circuit generating the request of the GSIGP to the GCU; the priority circuit PRT is a circuit determining the priority of the request when sent from the processor CPU; the GSIGP order receiver GORV is a circuit receiving the GSIGP request from the processor CPU and generating the request to the global control unit GCU; and the command executer COEX executes the request sent from the GCU through the GSIGP request receiver GRRV. In the SENSE order, the command executer COEX requests the status generator SGE to generate the status information, and in the reset and IPL order, the command executer COEX requests the service processor SVP to generate the status information and to execute the IPL operation, and requests the status generator SGE to also generate the status information. In the case of an interruption, the command executer COEX checks the state of the interruption pending latch ITPL. If the interruption pending latch ITPL is turned OFF, the command executer COEX turns ON the interruption pending latch ITPL and informs the status generator SGE that the ITPL is turned OFF. If the interruption pending latch ITPL is turned ON, the command executer COEX informs the status generator SGE that the ITPL is turned ON.

The interruption pending latch ITPL is turned ON by a request from the command executer COEX. Further, the interruption pending latch ITPL supervises the interruption mask to enable the interruption from the processor CPU, detects the processor CPU for which the interrupt mask is turned ON, and interrupts that processor. The I/O processor IOP carries out the input-/output processing. When a fault occurs at the I/O processor IOP, a SUBSYSTEM-DAMAGE signal is sent to the status generator SGE. The service processor SVP carries out a reset of the cluster and the IPL processing, and further, the service processor SVP processes the operator function. The status generator SGE generates the status information in accordance with the request from the command executer COEX, and further, takes in the information sent from the service processor SVP and the I/O processor IOP. The GSIGP request receiver GRRV receives the GSIGP request from the global control unit GCU, and the GSIGP acknowledge driver GADV returns the generated status information to the cluster which generated the order.

The lower part of FIG. 10 shows the unit for transferring the GSIGP orders and the unit for controlling the storage access as having drivers DRV, receivers RCV, a multiplexer MPX, a priority circuit PRT and a data access control circuit DACC. In case of an access request from the CPU to the GSU, the request is transferred to the GCU through the DACC in the MCU. The transfer of the IPL information between the LSU and the GSU is carried out by using the above-mentioned data access control circuits which are similar to those of conventional data processing system.

The many features and advantages of the invention are apparent from the detailed specification and thus it is intended by the appended claims to cover all such features and advantages of the invention which fall within the true spirit and scope thereof. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An apparatus for executing an initial program load between processors constituting a multiprocessor system, the processors being divided into a plurality of clusters, said apparatus comprising:
   global storage means for storing all initial program load information;
   a bus line, operatively connected to said global storage means;
   global control means, operatively connected to each of the clusters and said global storage means via said bus line, for processing orders transmitted between the clusters to cause a reset operation and an initial program load operation in the clusters and for accessing said global storage means, said control means including;
   priority means for determining a priority of each of the orders sent from each of the clusters for selective processing of the orders in dependence upon priorities thereof and for providing a logical cluster number for each of the clusters;
   logical-to-real cluster translation logic means for converting the logical cluster number of a specified cluster indicated in the order into a physical cluster number based on a connection state of the specified cluster and a power ON/OFF state of the specified cluster;
   logical-to-real cluster translation table means for storing the relationship between the logical cluster number and the physical cluster number;

cluster connection table means for indicating the connection state of the specified cluster; and cluster power-on table means for indicating the power ON/OFF state of the specified cluster;

memory control means, one provided in each of the clusters and operatively connected between said global control means and each of the processors in a corresponding cluster, for controlling transmission and reception of the orders between said global control means and the clusters, said memory control means including;

priority means for determining a priority of the orders sent from any of the processors in the corresponding cluster and for providing the priority and the orders to said global control means;

command execution means for executing the orders received from said global control means and for generating an interrupt request signal;

status generataion means for generating status information in accordance with the orders received from said command execution means; and interruption pending latch control means for turning ON an interruption pending latch in the one of the clusters in dependence upon the interrupt request signal;

local storage means, one provided in each of the clusters and operatively connected to said memory control means, for storing the initial program load information and transferring the initial program load information to said global storage means;

service processors, one provided in each of the clusters and operatively connected to said memory control means, for processing the reset operation and the initial program load operation in response to the orders; and direct access storage means, provided in a direct access storage group of the clusters including at least one but not all of the clusters and operatively connected to said memory control means, for storing the initial program load information, the service processors of the direct access storage group of the clusters executing the initial program load operation to the local storage means of the direct access storage group of the clusters, the local storage means of the direct access storage group of the clusters transferring the initial program load information to said global storage means, said global storage means transferring the initial program load information to the local storage means of any of the clusters not in the direct access storage group of the clusters.

2. A method for controlling an initial program load operation in a multiprocessor system, the multiprocessor system having a global storage unit, a global control unit and a plurality of clusters, each of the clusters having at least one processor including a service processor and a local storage unit, and a reset cluster included in the clusters, having a direct access storage device, the method comprising the steps of:

(a) executing an initial program load from the service processor in the reset cluster to the local storage unit in the reset cluster;

(b) transferring initial program information from the local storage unit in the reset cluster to the global storage unit;

(c) transferring the initial program information from the global storage unit to the local storage unit in any of the clusters other than the reset cluster;

(d) storing the initial program information from the direct access storage device to the local storage unit in the reset cluster by a first command from the service processor in the reset cluster;

(e) transferring the initial program information from the local storage unit in the reset cluster to a predetermined global storage unit;

(f) generating an initial program load order from the service processor in the reset cluster and supplying the initial program load order to another cluster;

(g) resetting all devices in the other cluster by a second command from the service processor in the other cluster predetermined area in the global storage unit to the local storage unit in the other cluster;

(h) supplying in succession the initial program load order from the service processor in the reset cluster to each of the clusters other than the reset cluster and the other cluster; and (i) executing the initial program load operation in each cluster when the service processor in each cluster receives the initial program load order.

3. A method for controlling an initial program load operation in a multiprocessor system, the multiprocessor system having a global storage unit, a global control unit operatively connected to the global storage unit, and a plurality of clusters operatively connected to the global control unit, each of the clusters having at least one processor and a local storage unit, and a first cluster of the clusters having a direct access storage device, the method comprising the steps of:

(a) loading an initial program from the direct access storage device to the local storage unit of the first cluster;

(b) transferring the initial program from the local storage unit of the first cluster to the global storage unit;

(c) generating a reset order for a second cluster using a processor of the first cluster; and (d) resetting the second cluster by transferring the initial program from the global storage unit to the local storage unit of the second cluster and processing the reset order generated in step (c) in a processor of the second cluster.

4. A method for controlling an initial program load operation as claimed in claim 3, further comprising the step of:

(e) resetting each of the clusters other than the first and second clusters by repeating steps (c) and (d) in succession for each of the clusters other than the first and second clusters.

* * * * *

UNITED STATES PATENT AND TRADEMARK OFFICE
CERTIFICATE OF CORRECTION

PATENT NO. : 5,349,664

DATED : September 20, 1994

INVENTOR(S) : Ikeda et al.

It is certified that error appears in the above-indentified patent and that said Letters Patent is hereby corrected as shown below:

On the title page: Item [*]

[*] Notice:, line 2, "Aug. 13, 2093" should be --July 13, 2010--.

Signed and Sealed this

Fourteenth Day of March, 1995

Attest:

BRUCE LEHMAN

*Attesting Officer*      *Commissioner of Patents and Trademarks*